United States Patent Office 3,100,804
Patented Aug. 13, 1963

3,100,804
VINYL AROMATIC OXYMETHYL OXY COMPOUNDS
John G. Abramo, Springfield, Mass., assignor to Monsanto Chemical Company, St. Louis, Mo., a corporation of Delaware
No Drawing. Filed July 11, 1958, Ser. No. 747,832
7 Claims. (Cl. 260—611)

The present invention relates to vinyl compounds and more particularly to vinyl or alkylene aromatic oxymethyl compounds having the structure:

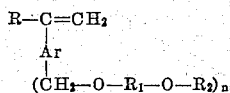

wherein Ar is an aromatic hydrocarbon radical selected from the group consisting of benzene, naphthalene and anthracene radicals, R is selected from the class consisting of hydrogen and methyl radicals, $R_1$ is selected from the class consisting of alkylene, arylene, oxyalkylene and oxyarylene radicals, $R_2$ is selected from the class consisting of hydrogen, alkyl and aryl radicals and $n$ is an integer of 1–3. This is a continuation-in-part of the copending application S.N. 747,828, filed July 11, 1958, now U.S. Patent 3,055,947, issued September 25, 1962.

The vinyl aromatic oxymethyl compounds of the present invention, because of the unsaturation exhibited by their monovinyl or alkylene substituents can be used as monomeric components with which to provide copolymers and homopolymers having utility as coatings on various substrates, films, fibers and the like. The utility of those having hydroxyl groups is enhanced because the hydroxyl groups can serve as sites for cross-linking with melamines, isocyanates and other materials, which is particularly desirable in coating compositions. Those containing the alkoxy and aryloxy groups exhibit increased adhesion which is also a desirable attribute to have in coating compositions.

Accordingly, it is a principal object of this invention to provide vinyl or alkylene aromatic oxymethyl compounds containing hydroxyl, alkoxyl and aryloxyl groups.

Other objects of this invention will in part be obvious and will in part appear hereinafter.

These and other objects of the invention are attained by a class of vinyl aromatic oxymethyl compounds having the structure:

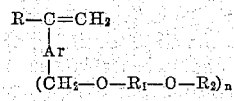

wherein Ar is an aromatic hydrocarbon radical selected from the group consisting of benzene, naphthalene and anthracene radicals, R is selected from the class consisting of hydrogen and methyl radicals, $R_1$ is selected from the class consisting of alkylene, arylene, oxyalkylene and oxyarylene radicals, $R_2$ is selected from the class consisting of hydrogen, alkyl and aryl radicals and $n$ is an integer of 1–3.

The following examples are given in illustration of the invention. Where parts are mentioned, parts by weight are intended unless otherwise described.

Example I

A flask is charged with 300 grams of ethylene glycol and 67 grams of potassium hydroxide in pellet form. The resulting solution is heated to 110° C. and stirred while 57 grams of p-(beta-chloroethyl)benzyl chloride are added dropwise. Stirring and heating are continued for 2 hours after the addition is completed.

The contents of the flask are poured into 500 cc. of water and extracted with three 100 ml. portions of benzene. The benzene extracts are combined and washed with water until neutral, (pH=7), and dried over $CaSO_4$.

A small amount of sulfur is added as a distillation inhibitor and the benzene is distilled off. Vacuum distillation is continued to yield a liquid boiling at 92° C./0.17 mm. Hg. Infrared confirms the presence of hydroxyl, vinyl, phenyl and ether groups thus identifying the compound as p-vinylbenzyl 2-hydroxyethyl.

Example II

A flask is charged with 400 ml. of n-butoxyethanol and a solution of 60 grams of sodium hydroxide in 50 ml. of water. The resulting solution is heated to 90° C. and 70 grams of p-(beta-chloroethyl)benzyl chloride are added dropwise with stirring. Stirring and heating are continued for 1 hour after the addition is complete.

The contents of the flask are poured into 500 ml. of water and the organic layer separated and dried over anhydrous magnesium sulfate. A small amount of sulfur is added as a distillation inhibitor and the excess butoxyethanol is distilled off. Vacuum distillation is continued to yield 55 grams of a liquid product boiling at 110°–112° C./0.2 mm. Hg. Infrared analysis confirms the presence of vinyl, phenyl, and ether groups thus identifying the compound as p-vinylbenzyl 2-butoxyethyl ether.

The vinyl aromatic oxymethyl compounds which can be produced according to the present invention include those having the structure:

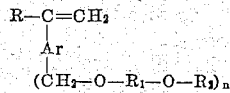

wherein Ar is an aromatic hydrocarbon radical selected from the group consisting of benzene, naphthalene and anthracene radicals, R is selected from the class consisting of hydrogen and methyl radicals, $R_1$ is selected from the class consisting of alkylene, arylene, oxyalkylene and oxyarylene radicals, $R_2$ is selected from the class consisting of hydrogen, alkyl and aryl radicals and $n$ is an integer of 1–3.

In the more preferred variations, the radicals represented by $R_1$ and $R_2$ are each limited to those having 1–10 carbon atoms when they are alkyl radicals and 6–20 carbon atoms when they are aryl radicals. With the increase in the number of the carbon atoms, difficulty is encountered in separating the materials from a given reaction medium. Simpler examples of the subject compounds are the o-, m- and p-vinylbenzyl 2-hydroxyethyl ethers and o-, m- and p-vinylbenzyl 2-methoxyethyl ethers. When R is methyl rather than hydrogen radical, representative compounds are the o-, m- and p-(2-propylene)-benzyl 2-hydroxyethyl ethers and the corresponding o-, m- and p-(2-propylene)benzyl 2-methoxyethyl ethers. Other alcohols and ethers are had where Ar is naphthyl, anthryl and like radicals, in place of the phenyl radical of the benzyl compounds. Examples of these include vinylnaphthyl oxymethyl ethyl alcohol and the corresponding methyl ether, vinylanthryl oxymethyl ethyl alcohol and the corresponding methyl ether and the various position isomers resulting from placement of the substituents on the aromatic radical Ar. Preferred examples of the vinyl aromatic oxymethyl compounds are p-vinylbenzyl 2-hydroxyethyl ether, p-vinylbenzyl 2-butoxyethyl ether, p-vinylbenzyl 2-(2-hydroxyethoxy)ethyl ether, p-vinylbenzyl 2-(2-butoxyethoxy)ethyl ether, and p-vinylbenzyl 2-hydroxybutyl ether.

Considered first from the standpoint of the principal substituents on the aromatic ring Ar, the monovinyl or alkylene substituent is limited to one in number and can be either a 2 or 3 carbon member having a single unsaturation as indicated by the radical R being either hydrogen or methyl. The oxymethyl substituent while preferably one in number can be up to three in number as indicated by the letter n representing an integer of 1–3. In the case where Ar is a phenyl radical and a single oxymethyl or etherified substituent is used these can be in the o-, m- or p-positions, with the latter preferred. It is also possible to include other nuclear substituents such as halogen, alkyl radicals, etc. on the aromatic ring, Ar.

The compounds of the present invention can be produced by reacting at a temperature of 50°–200° C. (a) a haloalkyl aromatic halomethyl compound having the structure:

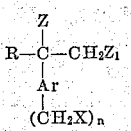

with (b) an alcohol composition having the structure:

$$H-O-R_1-O-R_2$$

in the presence of (c) a base metal component having the structure:

$$MOH$$

wherein throughout M is preferably selected from the class consisting of alkali metal and alkaline earth metals, R is selected from the class consisting of hydrogen and methyl groups, $R_1$ is selected from the class consisting of alkylene, arylene, oxyarylene, and oxyalkylene radicals, $R_2$ is selected from the class consisting of hydrogen, alkyl and aryl radicals, X is a halogen, Z and $Z_1$ are selected from the class consisting of hydrogen and halogen radicals with the further proviso that one should be halogen, and n is an integer of 1–3.

Considering the haloalkyl aromatic halomethyl starting material, and more particularly with respect to the haloalkyl substituent designed for unsaturation, the alpha and beta halogen can be used with preference directed to use of the beta chloro halogen variation. When the alpha-beta halogen variation is used as a starting material however, a less desirable product can result in that one of the halogens may be retained on the vinyl substituent of the final product. The number of halomethyl substituents on this starting material corresponds with the number desired on the ultimate vinyl aromatic oxymethyl oxy product. Aside from that the constituency of the aromatic radical Ar and the number of carbon atoms contained in the haloalkyl substituent of the haloalkyl aromatic halomethyl starting material should correspond with those of the alkylene aromatic oxymethyl end product. In this regard p-(beta-chloroethyl)benzyl chloride and p-(alpha-chloroethylene)benzyl chloride represent the most simple starting materials and can be used to produce corresponding vinyl aromatic oxymethyl alcohols and ethers containing a vinylbenzyl structure. The preceding benzyl chloride starting materials can in turn be provided by chloromethylation of the corresponding chloroethyl benzene. The analogous haloalkyl aromatic halomethyl compounds can also be obtained in like manner.

The alcohol compositions which can be used are diols and corresponding mono ethers. Examples of these include ethylene glycol and its monomethyl ether, diethylene glycol and the corresponding monomethyl ether, other monoalkyl ethers, monophenyl ether, and other corresponding mono aromatic ethers, propylene glycol, dipropylene glycol, hydroquinone, 1-4 hydroxy naphthalene and the corresponding monoalkyl and mono aromatic ethers of the preceding. As may be noted variations in the final product can be determined by the variations carried out with respect to the radicals defined as $R_1$ and $R_2$, with the former subject to being alkylene, arylene, oxyalkylene and oxyarylene radicals and the latter hydrogen, alkyl or aryl radicals.

The interreaction between the haloalkyl aromatic halomethyl compound and the alcohol is caused by carrying out the same in the presence of a base metal component, the same capable of providing a hydroxide or alkoxide anion in the presence of a polar solvent. In this regard the hydroxide is preferred although the alkoxides and aryloxides can be used. If either of the latter two is used it is desirable that the organic radical corresponds with that on the methoxy substituent of the final product. The amount of the base metal component to be used should be such as to contribute an anion equivalence at least equal to the number of halogens on the haloalkyl aromatic halomethyl compound, or equal to about $n+1$. Consequently the amount of equivalents of anion should be at least about twice that of the molar amount of the haloalkyl aromatic halomethyl compound in the simplest situations with corresponding increase in amount of the anion when the number of halogens to be replaced is increased due to increase in the number of halomethyl substituents. For best results an excess of the base metal component should be used. The base metal component can be added as such to the medium or can be formed in situ by adding the base metal itself or the oxide thereof to a medium containing available hydroxyl, alkoxyl or aryloxyl anions. Beyond this, the reaction can be carried out at temperatures ranging between 50°–200° C. Atmospheric, sub-atmospheric or super-atmospheric conditions and reflux conditions can be used as the occasion dictates. It is also desirable to have a polar solvent system to facilitate reaction; however, other solvent or suspension systems can be used which form a homogeneous reaction medium.

It will thus be seen that the objects set forth above, among those made apparent from the preceding description, are efficiently attained and, since certain changes can be made in the products and in carrying out the process of the present invention without departing from the scope of the invention, it is intended that all matter contained in the above description shall be interpreted as illustrative and not in a limiting sense.

What is claimed is:

1. A class of vinyl aromatic oxymethyl compounds having the structure:

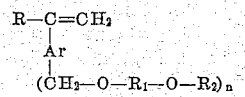

Wherein Ar is an aromatic hydrocarbon radical selected from the group consisting of benzene, naphthalene and anthracene radicals, R is selected from the class consisting of hydrogen and alkyl radicals, $R_1$ is selected from the class consisting of alkylene and oxyalkylene radicals, $R_2$ is selected from the class consisting of hydrogen, alkyl and aryl radicals and n is an integer of 1–3.

2. A method for producing a vinyl aromatic oxymethyl compound having the structure:

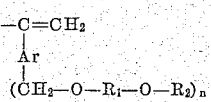

which comprises reacting at a temperature of 50°–200° C. (a) a haloalkyl aromatic halomethyl compound having the structure:

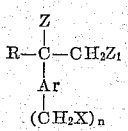

with (b) an alcohol composition having the structure:

$$H-O-R_1-O-R_2$$

in the presence of (c) a base metal component having the structure:

$$MOH$$

the equivalent amount of hydroxide ion being equal to at least twice the molar amount of said halomethylaromatic compound and wherein throughout Ar is an aromatic hydrocarbon radical selected from the group consisting of benzene, naphthalene and anthracene radicals, M is selected from the class consisting of alkali metals and alkaline earth metals, R is selected from the class consisting of hydrogen and alkyl radicals, $R_1$ is selected from the class consisting of alkylene, arylene, oxyalkylene and oxyarylene radicals, $R_2$ is selected from the class consisting of hydrogen, alkyl and aryl radicals, X is halogen, Z and $Z_1$ are selected from the class consisting of hydrogen and halogen radicals one of which is halogen, and $n$ is an integer of 1–3.

3. P-vinylbenzyl 2-hydroxyethyl ether.
4. P-vinylbenzyl 2-butoxyethyl ether.
5. P-vinylbenzyl 2-(2-hydroxyethyoxy)ethyl ether.
6. P-vinylbenzyl 2-(2-butoxyethoxy)ethyl ether.
7. P-vinylbenzyl 4-hydroxybutyl ether.

References Cited in the file of this patent
UNITED STATES PATENTS

| | | |
|---|---|---|
| 2,522,501 | Brooks et al. | Sept. 19, 1950 |
| 2,799,694 | Ross et al. | July 16, 1957 |
| 2,836,626 | Hatlelid | May 27, 1958 |

OTHER REFERENCES

Ross et al.: Jour. Amer. Chem. Soc., vol. 69 (1947), page 1917 (1 page). Patent Office Library.